United States Patent Office 3,452,779
Patented July 1, 1969

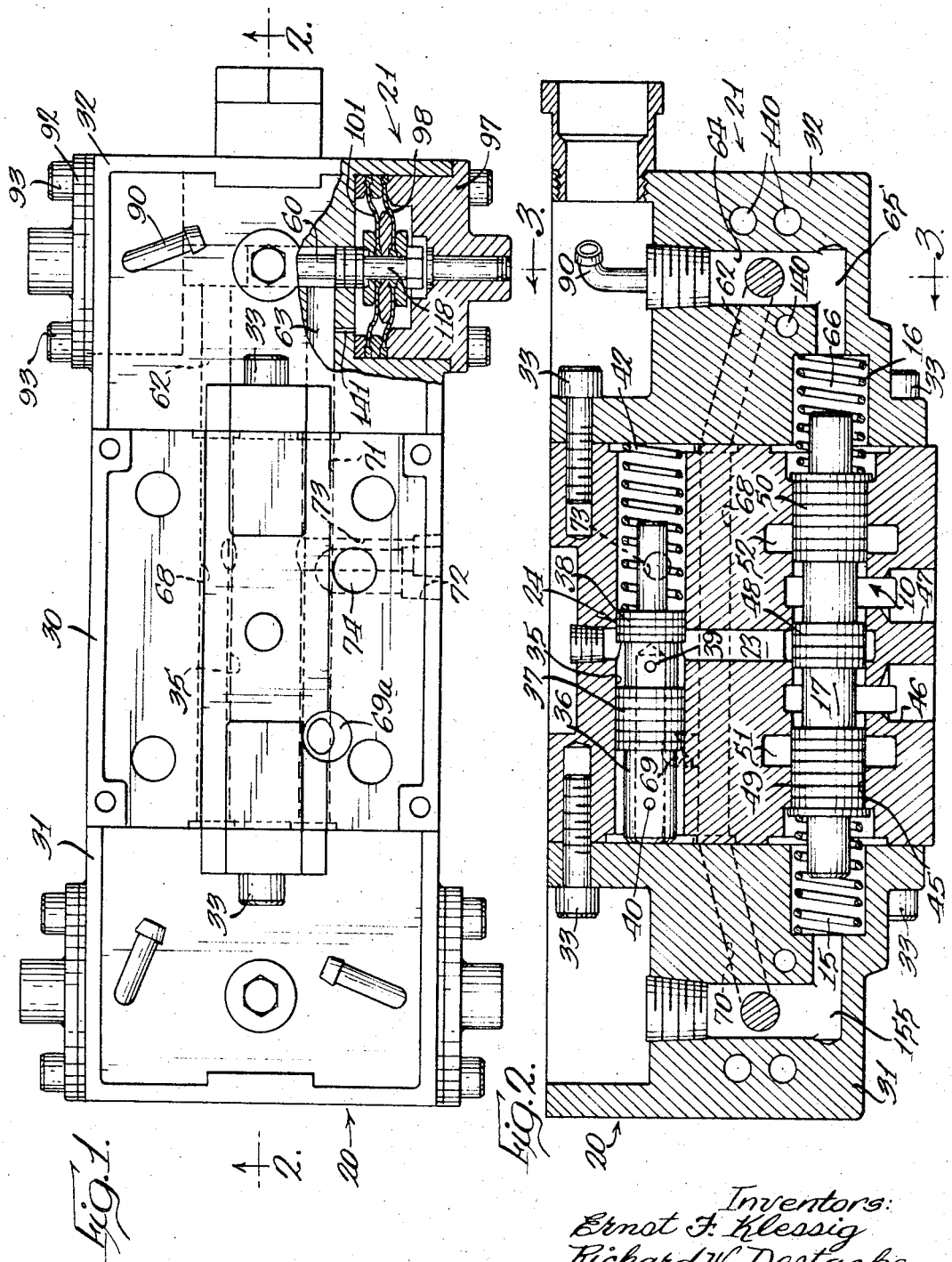

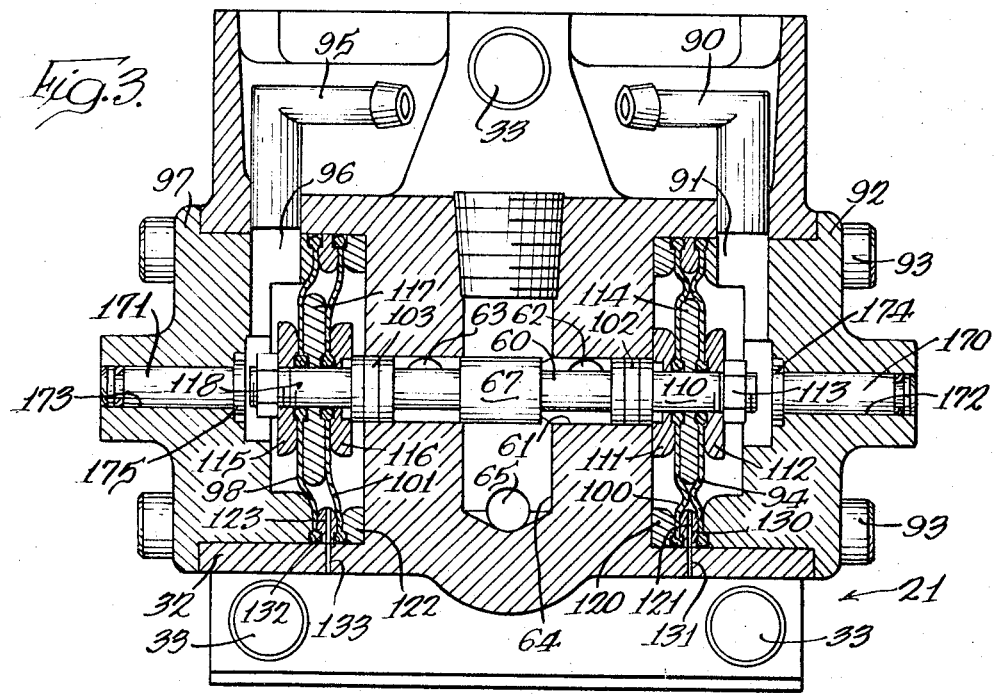
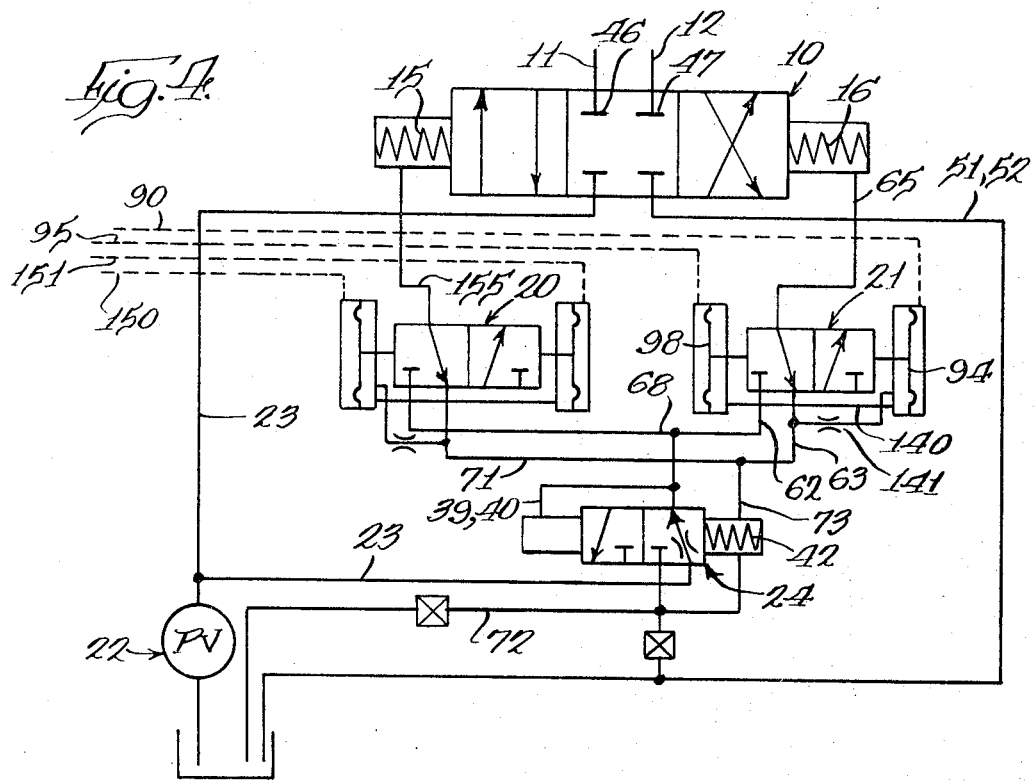

3,452,779
FLUIDIC INTERFACE VALVE AND CONTROL SYSTEM
Ernst F. Klessig, Racine, and Richard W. Destache, Milwaukee, Wis., assignors to Racine Hydraulics & Machinery, Inc., a corporation of Wisconsin
Filed Aug. 22, 1967, Ser. No. 662,465
Int. Cl. F17d *3/00;* F16k *31/16*
U.S. Cl. 137—596.14        11 Claims

ABSTRACT OF THE DISCLOSURE

A fluidic interface valve having operating diaphragms at each end of a pilot valve member, with additional isolating diaphragms to separate the controlled hydraulic fluid from the operating diaphragms and avoid hydraulic effects on the operating diaphragms and a system using a pair of such pilot valves for control of a valve which controls the supply of hydraulic fluid to a motor wherein the system includes a pressure reducing valve which also functions as an accumulator to improve the action of the system.

Background of the invention

This invention relates to fluidic control systems wherein relatively low pressure fluid, such as air, is used in a control circuit and provides for control of much larger forces, such as controlling a valve which controls the flow of fluid to an hydraulic motor.

More particularly, this invention relates to a fluidic interface valve which can function as a pilot valve responsive to a low pressure signal for shifting a valve member for controlling flow of hydraulic fluid to the pilot sections of a master control valve.

This invention further pertains to a fluidic control system wherein a reducing valve is used to reduce the pressure of hydraulic fluid controlled by the pilot valves and wherein the reducing valve is connected in circuit with the pilot valves to function as an accumulator to improve the action of the system.

Summary

An object of the invention is to provide a fluidic interface valve for controlling the flow of hydraulic fluid at moderate pressures by means of a control signal supplied by very low pressure fluid, such as air, wherein the air and hydraulic fluid are completely isolated from each other by means of double diaphragm systems, with one diaphragm being an operating diaphragm responsive to the control signal and the other diaphragm functioning as an isolating member to maintain the hydraulic fluid and the effects thereof away from the operating diaphragm.

Still another object of the invention is to provide a fluidic interface valve as defined in the preceding paragraph wherein the space between the operating and isolating diaphragms is vented to atmosphere to prevent transmission of hydraulic pulsing effects to the operating diaphragm and, further, to cause the pressure to act on the diaphragms to keep them taut and from reversing and further with there being a filler member in the space between the diaphragms to reduce the volume of compressible air therebetween.

Still another object of the invention is to provide a fluidic interface valve as defined in the preceding paragraphs wherein hydraulic fluid leakage from the valve is drained through a tank passage and with the connections including a restricted orifice to prevent the transmission of tank line surges back to the area of the isolating diaphragms to avoid adverse effects on the system.

A further object of the invention is to provide a fluidic control valve system utilizing the fluidic interface valve defined in the preceding paragraphs wherein a pressure reducing valve supplies reduced pressure hydraulic fluid to the valve member of the interface valve and the aforesaid tank passage is connected to the spring side of the reducing valve to have the pressure reducing valve function as an accumulator and result in faster action of the fluidic interface valve because of the fast transfer of hydraulic fluid provided by said accumulator.

Brief description of the drawing

Further objects and advantages will become apparent from the following detailed description taken in connection with the accompanying drawings in which:

FIG. 1 is a top plan view of the fluidic control valve system with a part thereof broken away;

FIG. 2 is a vertical section, taken generally along the line 2—2 in FIG. 1;

FIG. 3 is a vertical section on an enlarged scale, taken generally along the line 3—3 in FIG. 2; and FIG. 4 is a diagrammatic view of the circuit and components using USASI symbols.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Description of the preferred embodiment

A general understanding of the major components embodied in the invention can be obtained from reference to the diagram view of FIG. 4 wherein a master valve, indicated generally at 10, is provided for control of a pair of fluid lines 11 and 12 adapted for connection to a motor, such as a fluid cylinder. The master valve 10 is shown in the form of a pilot operated four-way valve, which is self-centering to a closed center position by way of springs 15 and 16 acting against opposite ends of the valve member 17 (FIG. 2). The master valve 10 is under the control of a pair of pilot valves, indicated generally at 20 and 21 of the same construction which are under fluidic control and each is shown as a three-way valve for controlling the supply of hydraulic fluid to an end of the master valve 10. The pilot hydraulic fluid is derived from a pump, indicated generally at 22, which, through a branch line 23, is connected to a pressure reducing valve, indicated generally at 24, to reduce the pressure of the fluid to a lesser value for use by the pilot valves.

The entire fluidic control valve system is in a single package having a multi-part body with a central body section 30 having end sections 31 and 32 connected thereto by bolts 33 and the end sections form mountings for the three-way fluidic interface valves 20 and 21. The central section 30 has an upper bore 35 which mounts the pressure reducing valve 24 with this valve having a movable valve member 36 and a pair of spaced-apart lands 37 and 38 lying to either side of an opening 39 through the wall of the valve member. The opening 39 communicates with an interior passage leading to the left-hand end of the valve member and an opening 40 whereby fluid at inlet pressure in the vertically-extending passage 23 is exposed to the left-hand end face of land 37. The resultant force acts toward the right against a spring 42 urging the valve member 36 toward the left, as viewed in FIG. 2. Thus, the value of the spring 42 determines the pressure of the fluid output from the pressure reducing valve, with the land 37 modulating across the passage 23 to maintain the reduced pressure.

The center body section 30 has a second bore 45 mounting the valve member 17 with a series of ports communicating therewith and opening to the bottom of the valve body section 30.

One of these ports (not shown) communicates with pressure passage 23, while ports 46 and 47 communicating with the bore are for connection to the lines 11 and 12 leading to the motor. A central land 48 on the valve member, when centered, blocks the passage 23 from communication with either of the ports 46 or 47. A pair of lands 49 and 50 on the valve member normally block a pair of tank passages 51 and 52 communicating with the bore. As is conventionally known in four-way valves, shifting of the valve member in one direction or the other from centered position connects the pressure passage 23 to either of the ports 46 or 47 and the other passage is connected to a tank passage.

Control of the position of the master valve member is provided by the fluidic interface valves 20 and 21, with each of these valves being of the same construction and valve 21 being described in detail and shown more particularly in FIGS. 1, 2 and 3, as illustrative.

The fluidic interface valve 21 has a valve member 60 mounted in a bore 61 in the body section 32. A pair of passages 62 and 63 communicate with the bore 61 and define pressure and tank passages, respectively. Either of these passages, through the bore 61, alternatively communicates with a vertical body passage 64 which is capped at its upper end and which, at its lower end, has a connecting passage 65 leading to a pilot chamber 66 forming the pilot section for the four-way valve and housing the spring 16. A land 67 on the valve member 60 controls the communication of either of passages 62 or 63 with the vertical passage 64 and, when positioned as shown in FIG. 3, permits pressure passage 62 to supply fluid under pressure to the pilot chamber 66. The pressure passage 62 extends upwardly at an angle to body section 32, as shown in FIG. 2, to communicate with a transverse passage 68 in the body section 30. This transverse passage obtains fluid under reduced pressure from the left-hand end of the reducing valve bore 35 by way of a downwardly and rearwardly angled passage 69 closed at the top by a cap 69a, shown in FIG. 1. This downwardly angled passage intersects the bore 35 and extends to the transverse passage 68. The left-hand end of the transverse passage 68 communicates with a passage 70 in the body section 31 to supply fluid at reduced pressure to the fluidic interface valve 20. The tank passage 63 extends upwardly in body section 32 similarly to the pressure passage 62 and connects with a transverse passage 71 in the body section 30. This transverse passage 71 intersects a tank port 72 opening to the front of the body section 30 and also communicates with a drilled passage 73 drilled in from the front of the body section 30 to intersect with the reducing valve bore 35 by way of a vertical passage (not shown) and capped by cap 74.

The position of the interface valve member 60 is controlled by a control signal from a fluid, such as air, operating down to a pressure substantially less than 1 p.s.i. supplied through an inlet fitting 90 to a space 91 defined between a body recess and an end cap 92 attached to the body section 32 by bolts 93. This air signal is applied against an operating diaphragm 94, which is in the form of an annular flexible member connected between the valve member and the body. Alternatively, the air signal can be applied to the opposite end of the valve member through a fitting 95 to a space 96 defined between a body recess and an end cap 97 attached to the body section 32 by bolts where the signal is applied against an operating diaphragm 98.

In order to isolate the operating diaphragms from the controlled hydraulic pilot fluid, a pair of isolating diaphragms 100 and 101 are associated with and spaced from the operating diaphragms 94 and 98. These diaphragms are blocked from direct communication with the valve bore 61 by lands 102 and 103, respectively, on the valve member 60.

The inner peripheral parts of the diaphragms are loosely clamped to the valve member 60 by inner and outer clamping members 111 and 112 fitted on a stem 110 at an end of the valve member and held thereon by a nut 113 threaded onto the stem. A filler member 114 is positioned between the diaphragms and mounted on the stem to maintain a space therebetween and to substantially reduce the volume of the space between diaphragms. Similarly, clamping members 115 and 116 and a filler member 117 are associated with a stem 118 at the opposite end of the valve member 60. The outer peripheral parts of the diaphragms are loosely captured between an inner ring 120 and the end cap 92 with a spacer ring 121 between the diaphragms. The pair of diaphragms 98 and 101 are captured by a ring 122 and the end cap 97 with there being a spacer ring 123 therebetween. In order to vent the space between the diaphragms to avoid transmission of hydraulic pulses to the operating diaphragms and to always have pressure acting on the diaphragms to keep them taut and from reversing, an air passage 130 is drilled through the spacer ring 121 and connects with a passage 131 drilled in the lower part of the body section 32. Similar passages 132 and 133 are provided to vent the space between diaphragms 98 and 101.

In order to minimize resistance to fast operation from a control signal of a small force magnitude, the diaphragms are assembled to be in a flexed condition when the valve member 60 is in central position, so that when the diaphragms have moved to an extreme position, as shown at the left in FIG. 3, adequate wall length in the diaphragms is available for this movement without resistance caused by stretching of the material. Additionally, since there must be bending of the diaphragms, the surfaces of the clamping and filler elements associated with all of the diaphragms are undercut or rounded, as shown in FIG. 3, so that the diaphragms do not have to bend around sharp corners.

As a normal function, there can be leakage of hydraulic fluid past the lands 102 and 103 of the valve member 60 which is captured in the end parts of the interface valve and this fluid can rapidly shift from end to end of the valve through a series of slosh holes 140 formed in the body section 32 and shown in FIG. 2. Additionally, this leakage fluid can flow to the tank passage 63 through a restricted orifice passage 141, shown in FIG. 1. This restricted passage still precludes reverse pressure surges in the tank line from acting to any great degree on the isolating diaphragms 100 and 101. The avoidance of surge effects is important since some fluidic devices can be shifted by changes in back pressure.

The action of the fluidic control valve system is improved by the connection of the tank passage 63 to the spring end of the reducing valve whereby this end functions as an accumulator. When the four-way valve shifts, one pilot chamber has hydraulic pilot fluid expelled therefrom and the speed of shift is increased by permitting this fluid to pass through passage 73 into the reducing valve spring end. After shift, the fluid can move to tank from the reducing valve at a gradual rate.

With the construction disclosed herein, it is possible to use a low pressure control signal to position the valve member 17 of the four-way valve, dependent upon the particular one of the fluidic interface valves that is operated.

Manual operation can be obtained by operation of one of the push pins 170 and 171 movable in bores 172 and 173, respectively, for selective engagement with stems 110 and 118, respectively. These pins are returned outwardly by pressure acting against flanges 174 and 175 on the inner ends thereof.

Referring to FIG. 4, with the interface valves shown as positioned, pressure from passage 23 passes through the pressure reducing valve to passage 68 and both fluidic interface valves 20 and 21 are positioned to block flow to pilot chambers of the four-way valve 10 so that the valve remains centered. If the four-way valve is to be shifted to the right, a control signal is applied through line 151 to the right-hand end of fluidic interface valve 20 to shift this valve to the left wherein reduced pressure passes through a line 155 to the pilot chamber housing the spring 15, with the result that the master valve shifts while at the same time the pilot chamber housing spring 16 remains connected through passage 65 to the tank passage. For the master valve to return to center position, the control signal is removed from line 151 and applied to line 150 wherein the interface valve 20 is brought back to normal position with the pilot passage 155 again being connected to the tank passage 71 and the springs 15 and 16 act to center. In the event the master valve 10 is to be shifted to the left, a control signal is applied through line 90 to act on the operating diaphragm 94 to shift the fluidic interface valve 21 to the left and connect the pressure line 68 to the pilot passage 65 while at the same time flow from the pilot chamber housing spring 15 can flow to tank. Again, restoration of the master valve to center position can be obtained by removing the control signal from line 90 and applying it to line 95 wherein the control air pressure acts on the diaphragm 98 to restore the interface valve 21 to the condition shown diagrammatically in FIG. 4 and the springs 15 and 16 act to center.

We claim:

1. A fluidic interface valve comprising, a body with a bore, a valve member movable in said bore to control hydraulic flow between an inlet passage and a control passage, means at each end of the valve member alternatively responsive to signal fluid pressure for positioning said valve member including a flexible annular operating diaphragm, and means for isolating each of said operating diaphragms from hydraulic fluid action such as pulsing including a pair of isolating annular flexible diaphragms associated one with each operating diaphragm in spaced relation thereto.

2. A valve as defined in claim 1 wherein the space between diaphragms is sealed except for passage means connecting the space to the exterior of the body to permit atmospheric pressure to exist in said space and prevent transmission of hydraulic pulsing against the isolating diaphragm to the operating diaphragm.

3. A valve as defined in claim 2 wherein a filler member is positioned between an operating diaphragm and an isolating diaphragm to reduce the volume of compressible air therebetween.

4. A valve as defined in claim 1 wherein all of said diaphragms have their inner peripheral portions attached to the valve member and their outer peripheral portions attached to the body, said diaphragms being mounted to be slightly flexed when the valve member is in a middle position intermediate the ends of its travel, and the surfaces associated with the valve member and body adjacent said diaphragms being undercut to reduce resistance to bending of the diaphragms during movement of the valve member.

5. A valve as defined in claim 1 wherein said body has a tank passage as well as a control passage and an inlet passage to function as a three-way valve, said valve member in one position connecting the inlet and control passages and in a second position connecting said control passage to the tank passage, slosh holes extended through said body to place the spaces adjacent the isolating diaphragms in hydraulic communication, and a restricted orifice passage connecting said spaces to the tank passage to permit flow of hydraulic fluid from the valve that has leaked past the valve member with the restriction reducing the effect of tank line surges on said isolating diaphragms.

6. A fluidic interface three-way valve comprising a body with a bore and having an hydraulic inlet passage, a tank passage and an intermediate control passage communicating therewith, a valve member in said bore having lands positioned to place said inlet and control pasages in communication in one position and said tank and control passages in communication in a second position, said body having means defining a pair of spaces at opposite ends of said bore with ends of said valve member extending one into each of said spaces, a pair of flexible annular operating diaphragms position one in each of said spaces, a pair of flexible annular isolating diaphragms positioned one in each of spaces between the adjacent land and operating diaphragms and in spaced relation to the latter, means on the valve member for fastening the inner peripheral parts of the diaphragms to the valve member, means for fastening the outer peripheral parts of the diaphragms to said body with the diaphragms being slightly flexed when the valve member is positioned intermediate the ends of its travel, passage means connecting the space between diaphragms to atmosphere, a filler member positioned between diaphragms to reduce the amount of compressible air between diaphragms, passage means interconnecting the portions of said spaces adjacent the isolating diaphragms, and a restricted passage operatively connecting the tank passage to said last mentioned passage means.

7. A fluidic control valve system for hydraulic power application comprising a valve body, a first hydraulic valve adapted to control hydraulic fluid flow to and from a fluid motor, a pair of signal pressure operated pilot valves for controlling the supply of hydraulic pilot fluid to said first valve, means for supplying hydraulic fluid to said pilot valves including a pressure reducing valve having a spring urging its valve member against inlet pressure, and means connecting the spring end of the pressure reducing valve to said pilot valves whereby said pressure reducing valve serves as an accumulator for said pilot valves.

8. A fluidic control system as defined in claim 7 wherein said first valve has pilot chambers at each end thereof with said pilot valves controlling the supply of the hydraulic fluid thereto and the spring end of the pressure reducing valve is connected to said chambers to receive a surge of hydraulic fluid therefrom and increase the speed of shift of said first valve.

9. A fluidic control system as defined in claim 7 wherein each of said pilot valves includes a body with a bore, a valve member movable in said bore to control hydraulic flow between an inlet passage and a control passage, means at each end of the valve member alternatively responsive to signal pressure for positioning said valve member including a flexible annular operating diaphragm, and means for isolating each of said operating diaphragms from hydraulic fluid action such as pulsing including a pair of isolating annular flexible diaphragms associated one with each operating diaphgram in spaced relation thereto.

10. A fluidic control system as defined in claim 9 wherein said body has a tank passage as well as a control passage and an inlet passage to function as a three-way valve, said valve member in one position connecting the inlet and control passages and in a second position connecting said control passage to the tank passage, slosh holes extended through said body to place the spaces adjacent the isolating diaphragms in hydraulic communication, and a restricted orifice passage connecting said spaces to the tank passage to permit flow of hydraulic fluid from restriction reducing the effect of tank lines surges on said isolating diaphragms.

11. A fluidic control system as defined in claim 10 wherein a passage connects said tank passage to the spring end of the reducing valve to define said connecting means whereby the pressure reducing valve serves as an accumulator.

References Cited

UNITED STATES PATENTS

| | | | |
|---|---|---|---|
| 3,234,957 | 2/1966 | Allen | 137—596.12 XR |
| 3,253,516 | 5/1966 | Huntington et al. | 137—625.66 XR |
| 3,300,255 | 1/1967 | Racki | 137—625.66 XR |
| 3,320,968 | 5/1967 | Nuss | 137—117 |

HENRY T. KLINKSIEK, *Primary Examiner.*

U.S. Cl. X.R.

98—119; 137—625.66, 596.1